United States Patent [19]
Surot

[11] Patent Number: 5,098,157
[45] Date of Patent: Mar. 24, 1992

[54] WIDTH-ADJUSTMENT CHILD SEAT

[75] Inventor: Patrick Surot, Cholet, France

[73] Assignee: Ampafrance S.A., Boulogne-Billancourt, France

[21] Appl. No.: 532,566

[22] Filed: Jun. 4, 1990

[30] Foreign Application Priority Data

Jun. 2, 1989 [FR] France ............... 89 07336

[51] Int. Cl.$^5$ .................................................. B60N 2/26
[52] U.S. Cl. .................................. 297/250; 297/325; 297/459; 297/460
[58] Field of Search ............... 297/250, 284, 325–327, 297/459, 460

[56] References Cited

U.S. PATENT DOCUMENTS

| | | | |
|---|---|---|---|
| 3,948,556 | 4/1976 | Hyde et al. | 297/250 |
| 4,082,350 | 4/1978 | Tomforde | 297/250 |
| 4,205,877 | 6/1980 | Ettridge | 297/250 |
| 4,456,302 | 6/1984 | Knoedler et al. | 297/250 |
| 4,536,030 | 8/1985 | Sakurada et al. | 297/284 |
| 4,568,122 | 2/1986 | Kain | 297/250 |
| 4,636,000 | 1/1987 | Nishino | 297/284 |
| 4,696,514 | 9/1987 | Maloney | 297/284 |
| 4,790,593 | 12/1988 | Davalos et al. | 297/250 |
| 4,895,412 | 1/1990 | Deley et al. | 297/460 |

FOREIGN PATENT DOCUMENTS

| | | |
|---|---|---|
| 0121899 | 10/1984 | European Pat. Off. |
| 1956844 | 12/1966 | Fed. Rep. of Germany |
| 3031581 | 3/1981 | Fed. Rep. of Germany |
| 8325796 | 12/1983 | Fed. Rep. of Germany |

Primary Examiner—Laurie K. Cranmer
Assistant Examiner—Milton Nelson, Jr.
Attorney, Agent, or Firm—Oblon, Spivak, McClelland, Maier & Neustadt

[57] ABSTRACT

A child's seat, which is possible to position and fix onto a motor vehicle seat, including a frame covered with a padding including two lateral edges forming, together with the seat, a bucket seat, the lateral frame elements defining the lateral edges being articulated relative to the main frame elements defining the seat and the backrest so as to be able to modify the width of the bucket seat.

3 Claims, 3 Drawing Sheets

WIDTH-ADJUSTMENT CHILD SEAT

BACKGROUND OF THE INVENTION

1. Field of the Invention

The subject of the present invention is a child seat which it is possible, in particular, to position and fix on a seat, such as a motor vehicle seat.

2. Discussion of the Background

Seats of this type, and in particular safety seats currently used in motor vehicles, comprise a metal and generally tubular frame covered with a padding, including two lateral edges forming, together with the seat, a sort of bucket seat which retains the child from the sides.

These seats which are currently available on the market have, however, the disadvantage of being matched only to the general shape of a child over a certain age range. A smaller or less well-built child or alternatively a child wearing few clothes, for example in summer, is consequently not suitably secured in his seat, in particular laterally. On the other hand, it has been noted that an older child or one wearing more clothes, for example in winter in a still poorly heated vehicle, has no freedom of movement.

The object of the invention is to overcome this type of difficulty by enabling the seat to be adapted to the shape of the child, to his age and to the amount of clothing he is wearing.

To this end, the child seat of the present invention can be positioned and fixed on a seat of, for example, a motor vehicle. The seat includes a frame having a padding cover and has two lateral posts defining a back rest, and a transverse post defining a head rest area, the two lateral posts of the frame having bent extensions defining an area for supporting the legs of a child. The seat also includes two lateral frame elements connected, respectively, to the two lateral posts and forming a bucket seat. Articulation means are also provided for modifying the width dimension of the seat and includes means for articulating the two lateral frame elements both at an upper end and a lower end thereof, the means for articulating the two lateral frames including first and second sleeves mounted on the lateral posts, respectively, to which the lateral frame elements are fixed such that the frame elements are rotatable relative to the lateral posts and relative to the extensions around which they are mounted.

The articulation preferably takes place by rotation of sleeves mounted around the main tubular frame elements.

It is possible for means to be provided which immobilize and lock the various lateral frame elements in an extreme position and in the various intermediate positions.

In an advantageous embodiment of the invention, a member may also be provided for interconnecting the lateral frame elements so as to synchronize their movement. In this manner, action on only one of the lateral frame elements causes the other to move.

BRIEF DESCRIPTION OF THE DRAWINGS

The invention will be better understood upon studying the detailed description of an embodiment made by way of non-limiting example and illustrated in the attached drawings, in which.

BRIEF DESCRIPTION OF THE PREFERRED EMBODIMENTS

Figure 1:
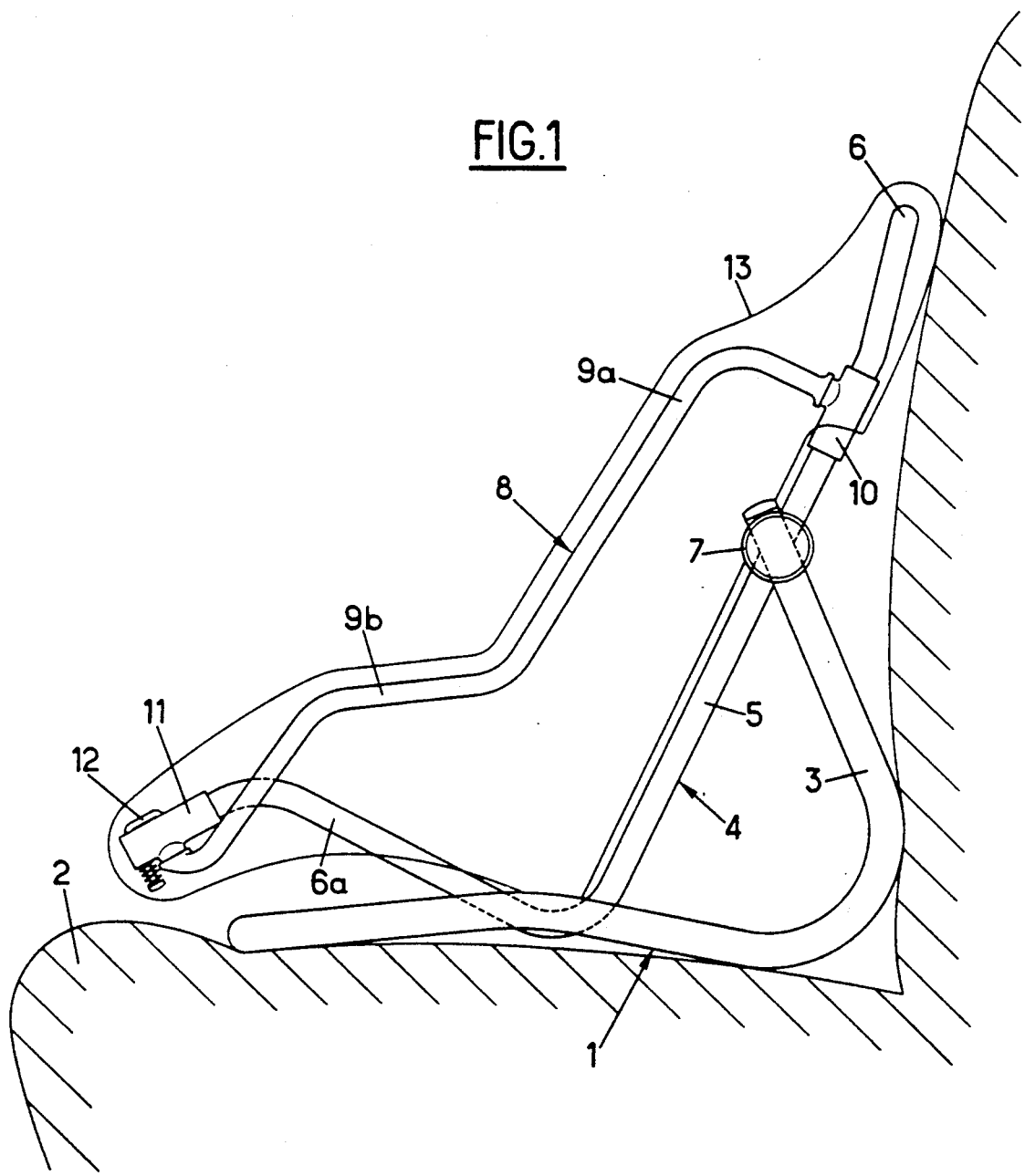
FIG. 1 is a schematic side view of a seat according to the invention, mounted inside a motor vehicle and showing the structure of the metal frame inside the padding of the seat.
Figure 2:
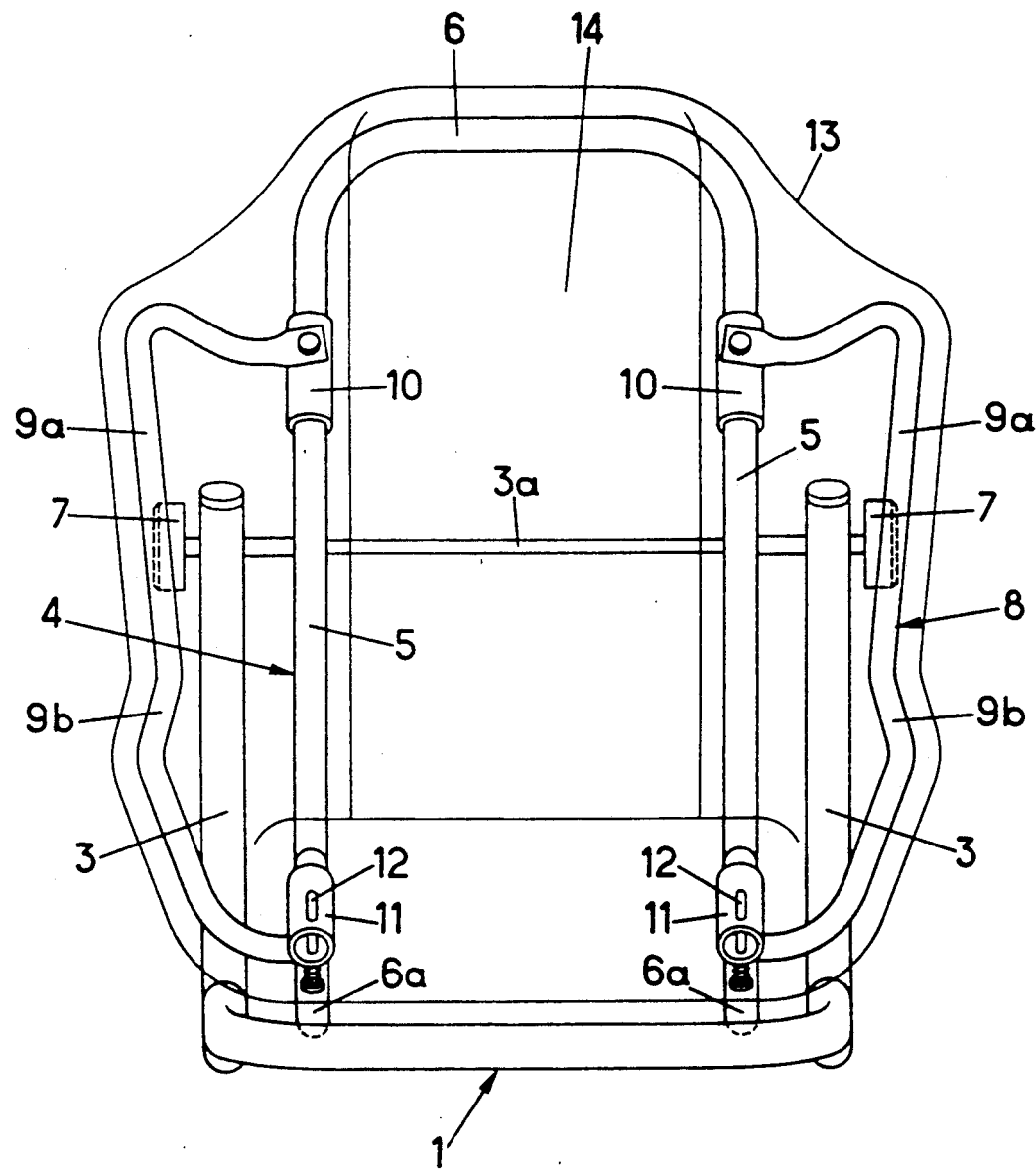
FIG. 2 is a view in elevation of the seat in FIG. 1 showing the lateral frame elements in the position which they occupy for the maximum width of the bucket seat.
Figure 3:
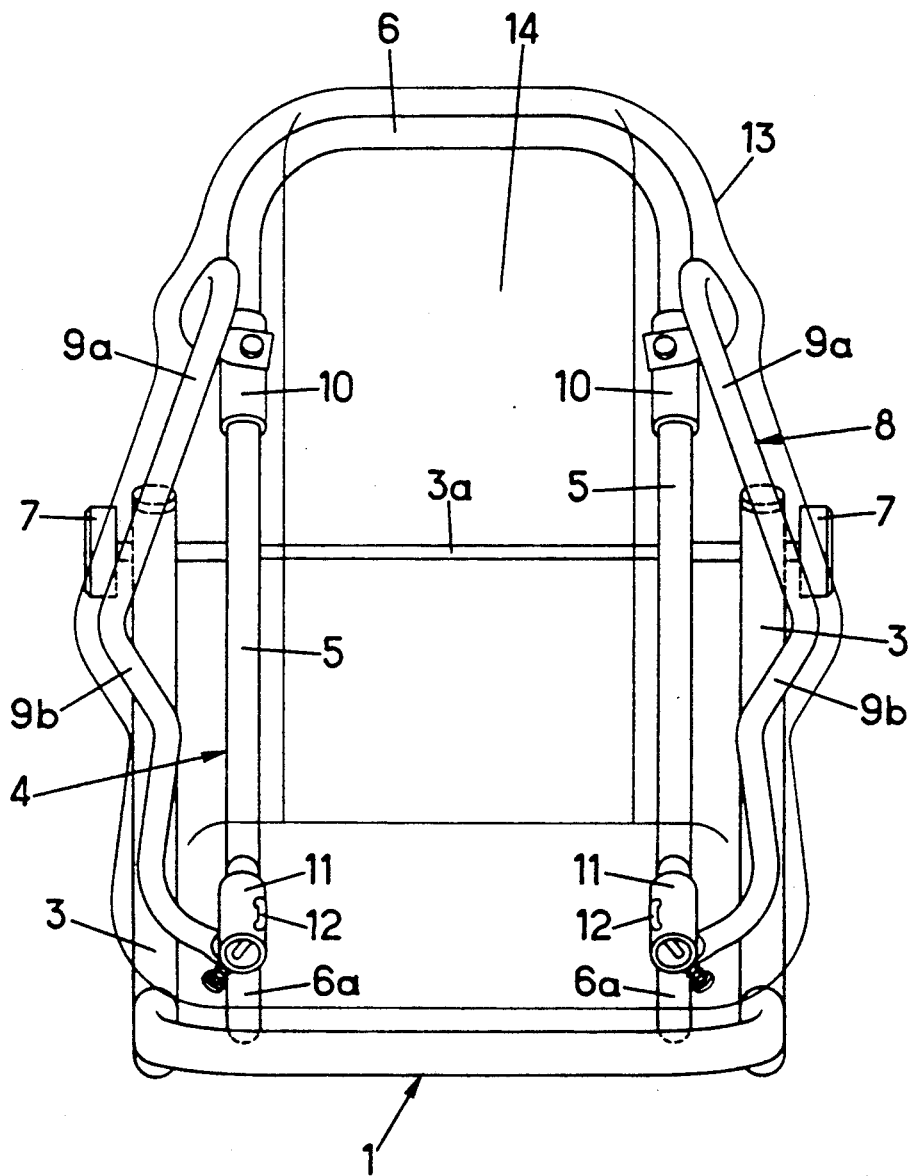
FIG. 3 is a view similar to FIG. 2 showing the position of the lateral frame elements corresponding to the minimum width of the bucket seat.

As illustrated in the figures, the child seat according to the invention comprises an angled support 1 which is positioned and bears on a main seat, for example a motor vehicle seat. The support 1 has a fork shape, the two arms 3 of which are bent upwards. A hinge rod 3a, which can be seen in FIGS. 2 and 3, is mounted between the two arms 3 and serves simultaneously for the mounting of the frame of the child seat, referenced as a whole by number 4. The frame 4 comprises two parallel lateral posts 5 defining the backrest of the seat, interconnected by a transverse post 6 defining the head-rest area. The seat itself and the area for supporting the legs of the child are defined by the slightly bent upwards extensions 6a of the lateral posts 5 (see FIG. 1).

The whole seat can pivot and its angular position may be adjusted by acting on the lateral wheels 7 which control the orientation of the seat relative to the rod 3a.

Two identical lateral frame elements 8 define the lateral edges of the seat. The lateral frame elements 8 have an upper portion 9a which protects the head of the child from lateral movements and a lower portion 9b close to the horizontal which plays the role of an arm-rest and protects the child against lateral movements in the lower part of the seat.

Each lateral frame element 8 is fixed at an upper part thereof to a sleeve 10 which may rotate about the tube forming the lateral post 5. At a lower part thereof, each lateral frame element 8 is connected to a second sleeve 11 which can rotate about the lower end of the lateral post 6. A locking finger 12 individually ensures the securing of the lateral frame element 8 in various positions by interacting with perforations, not shown in the figures, formed on the tube 6.

As is seen in the figures, upper sleeves 10 therefore are mounted on lateral posts 5 defining the back of the seat whereas each second sleeve 11 is mounted on portion 6a slightly folded upward, which defines the seat.

Moreover, lateral frame elements 8 are attached to the sleeves 10 by facing the inside part of the seat whereas the attachment to second sleeve 11 is made, on the contrary, in an opposite way, toward the bottom, (i.e. toward the outside face of the seat).

Due to these features, easy modification of the shape of the seat is obtained which perfectly fits the morphology of the child in all positions.

Padding 13, the periphery of which is indicated in thin lines in the figures, covers all the frame elements of the seat, also including the lateral frame elements 8. As can be seen in FIGS. 2 and 3, the backrest of the seat itself 14 is defined between the two lateral posts 5. The area situated between the seat 14 and the lateral frame elements 8 defines, together with its padding 13, the lateral protection of the seat.

If, starting from the position illustrated in FIG. 2 which corresponds to the maximum width of the bucket seat formed by the seat, the two lateral frame elements 8 are rotated towards each other, the position illustrated in FIG. 3 is reached which corresponds, conversely, to the minimum width of the bucket seat. In this position, the lateral protection elements are substantially perpendicular to the plane of the backrest 14 such that the width of the bucket seat is minimum and the child is held tightly between the lateral protection elements.

If, however, the child is more well-built, if he is older or alternatively if he is wearing a lot of clothes, the two lateral frame elements 8 need only be rotated in the direction which separates them from each other in order to return to the position in FIG. 2 where the bucket seat conversely adopts the maximum width.

It will, of course be understood that all intermediate positions are possible and that it is also possible for the two lateral frame elements to be interconnected by an appropriate member, for example, in the part of the seat supporting the legs, so as to synchronize the relative movements of the two lateral frame elements 8.

Although the invention has been illustrated using an example of a seat which can be adapted to a motor vehicle, it will be understood that the same inventive idea may be applied to a child seat which may be adapted to another seat or alternatively be self-supported. In all cases, it will be possible for the width of the seat to be adapted to the age and shape of the child.

What is claimed as new and desired to be secured by Letters Patent of the United States is:

1. A child's seat, for being positioned and fixed onto a motor vehicle seat, which comprises:
   a frame having a padding cover and which includes two lateral posts defining a backrest,
   a transverse post defining a head-rest area,
   the two lateral posts of the frame having bent extensions defining an area for supporting the legs of a child;
   two lateral frame elements connected, respectively, to the two lateral posts and forming a bucket seat;
   articulating means for modifying a width dimension of the seat and including means for articulating the two lateral frame elements both at an upper end and a lower end thereof, said means for articulating said two lateral frames including first and second sleeves mounted on said lateral posts, respectively, to which said lateral frame elements are fixed such that said frame elements are rotatable relative to the lateral posts and relative to said extensions around which they are mounted.

2. Child seat according to claim 1, wherein each of the lateral frame elements has an upper portion for protecting the head of the child and a lower substantially horizontal portion for serving as an armrest.

3. Child seat according to claim 1 which comprises locking means for securing the lateral frame elements in extreme and intermediate positions.

* * * * *